Jan. 5, 1965

W. HOLZER 3,164,729

DRIVING MEANS OF A PROGRAM CONTROL
APPARATUS FOR WASHING MACHINES

Filed March 16, 1960

INVENTOR
WALTER HOLZER

By Toulmin & Toulmin

Attorneys

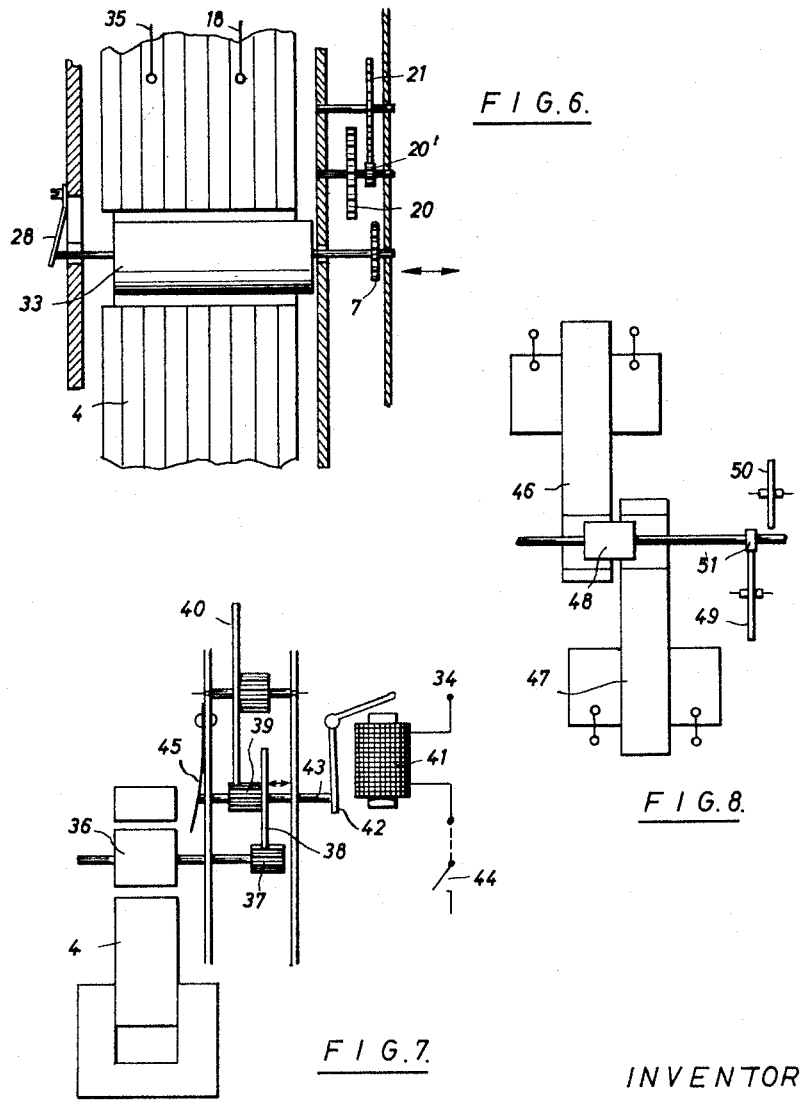

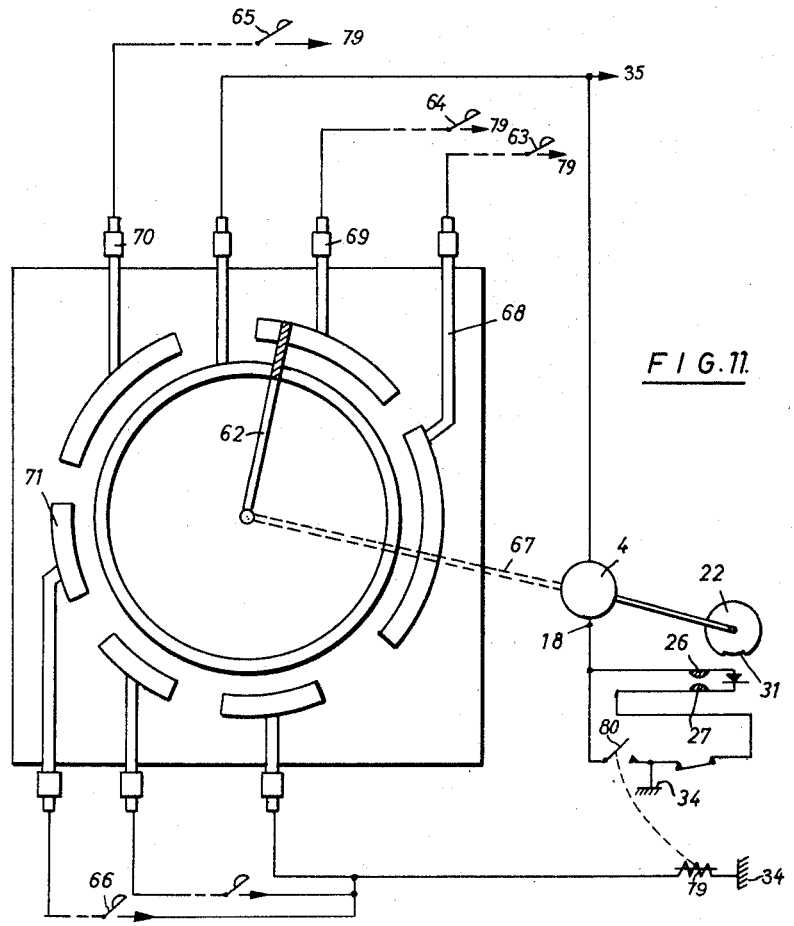
FIG. 11.
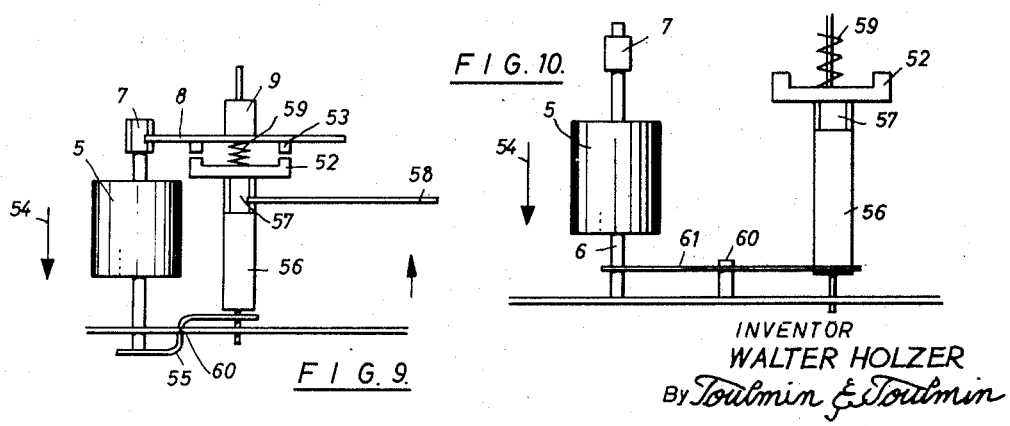
FIG. 10.
FIG. 9.
INVENTOR
WALTER HOLZER
By Toulmin & Toulmin
Attorneys

United States Patent Office 3,164,729
Patented Jan. 5, 1965

3,164,729
DRIVING MEANS OF A PROGRAM CONTROL APPARATUS FOR WASHING MACHINES
Walter Holzer, Meersburg (Bodensee), Germany
Filed Mar. 16, 1960, Ser. No. 15,389
Claims priority, application Germany, Mar. 20, 1959, H 35,924; June 1, 1959, H 36,522; June 15, 1959, H 36,665; July 25, 1959, H 37,020; Oct. 24, 1959, H 37,772
16 Claims. (Cl. 307—141)

The present invention relates to a driving apparatus for a program control device having a timed pulse device and a step switching device to be particularly useful in washing machines.

In the usual arrangement the pulse device furnishing timed pulses for the stepping of a program switch, and the driving means for the program contacts each have a separate motor. The separate motors were a necessity since the pulse device must function at precise intervals, thus requiring a motor with highly constant speed, while the stepping of the program contacts in intermittent service requires an asynchronous motor, i.e., a motor with a high torque. This motor, as a rule, does not have the constant speed necessary for synchronous operation.

Further disadvantages of using two motors include the increased probability of breakdown, the need for more space, and the increased production costs. The object of this invention is to avoid these disadvantages and to employ a single motor for the function usually carried out by two. Nevertheless, the same advantages must be retained in respect to versatility and further requirements for the precise functioning of the impulse device and the stepping device for the program contacts.

The object of this invention is to avoid the disadvantages of the known devices, and to use but one motor for driving both, a timer and a step switching device.

It is a primary feature of the present invention to employ two different gears linkable with a pinion driven by a single motor; the gears in turn are drivingly connected to a pulse device and a step switching device, respectively, and there is an electromagnetic device for disengaging selectively that gear from the pinion which is connected to the step switching device, after one step, while re-engagement is caused in dependence upon the pulse device.

Another feature of the invention is to be seen in the provision of a clutch-and-lever arrangement actuated upon the motor rotor upon shifting thereof. The particular advantage of such an arrangement is to be seen in the fact that only claws of a clutch and no teeth of a gear are caused to engage and disengage.

Another feature of the invention is a cam disc rotating together with the program control and temporarily interrupting a link or driving connection or coupling within the gear transmission driving the pulse control so that the latter can return to zero or initial position. Another feature of the invention is a spring biased gear or clutch governing the link between rotor and program control; the spring bias is overcome by an electric control shifting the rotor into driving engagement with the program control, while the electric control is disabled by the program control itself after one step, and then the spring shifts the rotor back whereby the latter is disengaged from the program control.

In accordance with this kind of design, a motor with a specially built coupling is used to ensure that both the pulse device and the stepping device for the program contacts return independent of one another to their initial positions after the conclusion of a pulse or a step.

A motor which is specially suited for the simultaneous drive of the impulse device and the stepping of the program contacts has a shiftable armature slidably in axial direction, so that the sliding armature through pole functions as a synchronous motor in one axial position and as an asynchronous motor in a second position axially displaced from the first mentioned position.

This arrangement can be considered the ideal solution, since on the one hand it ensures absolute precision of the pulse transmission, and on the other hand it provides the greatest amount of torque for the stepping of the program contacts. In accordance with this construction, the drive can be shifted from impulse device to program contacts in merely using control currents. There may be provided manually operated contacts, operating together with the program contacts, since when the predetermined position is reached, it is by-passed because the automatic cut-out contacts of the drive motor are bridged.

This arrangement permits the arbitrary exclusion or by-passing of whole program sections in order to change the program. We are dealing here with rapid pre-selection.

Another possibility is to have the rotor axially slidable so as to cooperate with either one of two axially aligned stator yokes.

A still further possibility resides in the provision of having the rotor retain its axial position with respect to a stator, while the step switching device controls the current to an electromagnet which in turn shifts the gear for the step switching device in and out of engagement with a pinion on the rotor shaft.

While the specification concludes with claims particularly pointing out and distinctly claimed the subject matter which is regarded as the invention, it is believed that the invention, the objects of the invention, and further objects and advantages thereof, will be better understood from the following description taken in connection with the accompanying drawing in which:

FIG. 6 shows another possible design of the coupling between a rotor and pulse and step switching device;

FIG. 7 shows an electromagnetic clutch;

FIG. 8 shows a sliding rotor in a divided magnetic yoke;

FIG. 9 illustrates a slidable rotor operating upon a clutch-and-lever arrangement;

FIG. 10 illustrates a modified clutch-and-lever arrangement as compared with FIG. 9; and FIG. 11 illustrates an electrical circuit diaphragm useable in connection with the apparatus of the present invention.

Figure 1:
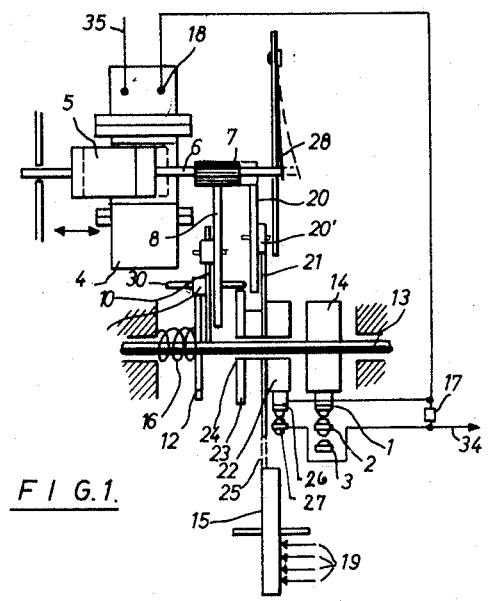
FIG. 1 shows schematically the application of one motor to drive a pulse device as well as a stepping device, using a motor which functions alternately as a synchronous or asynchronous motor.

FIG. 1 shows one possible construction in an arrangement in which a single motor operates a pulse device as well as the stepping of program contacts over a coupling. In FIG. 1 a pulse contact system, consisting of contacts 1, 2 and 3 is driven by a motor 4 having an axially displaceable rotor 5 with shaft 6. Contacts 1, 2 and 3 are operated upon by the following intermediate elements: Armature rotor 5 has a pinion 7 on its shaft 6, which together with its gear wheel 8 and a pinion 9 drives an intermediate wheel 10 having pinion 10 which in turn drives a gear wheel 12. Gear wheel 12 is secured to shaft 13 carrying a cam disc in which directly operates contacts 1, 2 and 3. Contacts 1, 2 and 3 are closed in sequence when cam disc 14 is turned. The closing of these contacts in sequence may also be used to start a stepping of switching disc 15, which, in turn, operates program contacts 19, as well as the other contacts not shown. This will be described below.

In accordance with the principles of the invention, the cam disc 14 is driven via a coupling formed by the intermediate wheel 10 and its pinion 11. This pinion 11 can be disengaged from gear wheel 12. When pinion 11 is disengaged, spring 16 recoils by rotation gear wheel 12, shaft 13, and cam disc 14 back into their initial or zero position.

Figure 4:
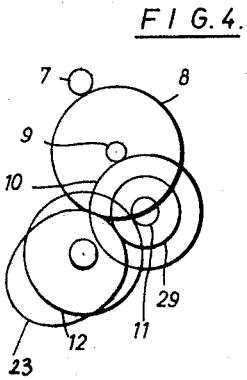
FIG. 4 shows a side view of the wheels in FIG. 2.
Figure 5:
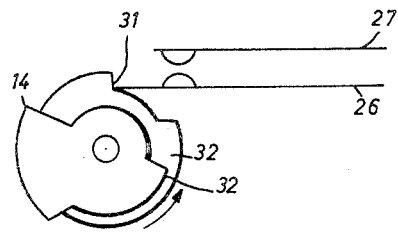
FIG. 5 shows one possible arrangement of a contact system of a pulse device including an automatic cut-out or self-interruption mechanism.

The stepping of switching disc 15 is produced by motor 4 by means of other intermediate elements, but disc 15 is not always coupled drivingly to member 4. Power transmission is achieved in the following manner and by means of the following elements. There is provided an electrical resistor 17 connected in series in the lead-in wire to motor winding 18. Resistor 17 can be over-bridged by contacts 26–27. Armature or rotor 5 moves into the position indicated by the dotted lines under the influence of the increased magnetization. Increased magnetization occurs when resistor 17 is short-circuited. When rotor 5 is in the "dotted" position pinion 7 is engaged with gear wheel 20 having a pinion 20'. Pinion 20' meshes with a drive wheel 21. Drive wheel 21 is integral with or secured to cam discs 22 and 23. Cam disc 22 is depicted in FIG. 5, disc 23 is eccentric as shown in FIG. 4. Eccentric disc 23 and disc 27 is keyed onto hollow shaft 24 receiving shaft 13 Drive wheel 21 drives switching disc 15 for program contacts 19, eventually over intermediate elements 25.

Cam disc 22 operates contacts 26 and 27 bridging resistor 17 during any one step, until cam disc 22 has returned to its initial position and opened contacts 26 and 27 by means of recess 31. In that way resistor 17 is placed again in series circuit connection of motor 4. In this instance armature or rotor 5 is forced back into its initial position by spring 28.

Figure 2:
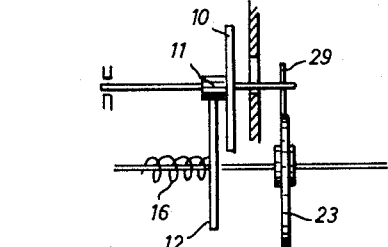
FIG. 2 shows one position of a coupling shown in FIG. 1 in action.

During one revolution of cam disc 22, corresponding to one step of switching disc 15, the eccentric disc 23 temporarily disengages intermediate wheel 10 and pinion 11 from gear wheel 12. This operation will be comprehended in conection with FIGS. 2 and 3. In FIG. 2 pinion 11 is engaged with gear wheel 12 and pulse contacts 1, 2 and 3 are then driven by cam disc 14.

Figure 3:
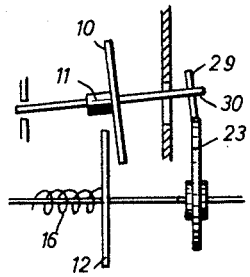
FIG. 3 shows the disengaged position of the coupling in FIG. 1 in action.

In FIG. 3 eccentric disc 23 is in a position occurring during the stepping (rotation of elements 22, 23 and 24) that an intermediate wheel 29 (omitted in FIG. 1) together with shaft 30 carrying intermediate wheel 10 and pinion gear 11, are raised. In this position pinion 11 and gear wheel 12 are disengaged and spring 16 recoils gear wheels 12, shaft 13 and cam disc 14 by rotation, into their initial position, which is the initial position of the timer or pulse device.

FIG. 4 shows the gearing in FIGS. 2 and 3 from a side view. It is particularly important that the axial shift needed to engage pinion 7 and gear wheel 20 is used to change the running characteristics of motor 4. When rotor 5 is in the position shown in the drawing, it functions, in the presence of poles, as a synchronous motor which, with a small load, operates with the greatest precision. In the position indicated by the dotted lines, corresponding to an increased magnetization current, the motor functions as an asynchronous motor and is capable of producing a relatively high amount of torque. This is necessary in order to operate switching disc 15 and a number of program contacts 19.

In other words, when rotor 5 is in the position indicated, it is only partially exposed to the magnetic yoke, and then only from the influence of the magnetic field. It only needs a small torque when driving the pulse device, i.e., in this position it has a good synchronism, and enables the pulse device or the corresponding cam discs with contacts to turn exactly.

When engaged, that is, in the position shown, it provides more torque due to the strong magnetization, and is now suitable for operating the stepping of the program contacts as a motor connected to an automatic cut-out. The motor comes in the position shown by the dotted lines through an increased magnetization current which must be great enough that armature shifts counter to the force of a readjusting spring. The spring will be described later.

This arrangement described thus far, operates in the following way. First motor 4 runs as a synchronous motor and drives cam disc 14 out of its initial position so that contacts 1, 2 and 3 be closed after predetermined times. This is the timer action of the pulse device. The contacts may also effect an increase of the magnetization current over a pre-selector not appearing in the drawings, overbridging resistor 17. The increased magnetization current pulls rotor 5 into the position indicated by the dotted lines. Now pinion 7 engages wheel 20 and switching disc 15 is rotated with a high amount of torque; cam discs 22 and 23 follow this rotation. Cam disc 22 operates contacts 26 and 27 as stated. These contacts 26 and 27 maintain the increased magnetization current by continuing the bridging of resistor 17 until cam disc 22 has revolved completely. Thus, resistor 17 remains out of circuit even if contacts 1–3 are opened by the recoiling of cam disc 14 as described above. Cam disc 22 insures that a complete revolution of elements 22 and 23 is carried out before contacts 26 and 27 are opened so that a complete step of switching disc 15 takes place with motor 4 running as a synchronous motor. When recess 31 opens contacts 26 and 27, rotor 5 returns to its initial position due to the decreased magnetization current. Pinion 7 then again is disengaged from gear wheel 20, and the movement of the switching disc 15 and of cam discs 22 and 23 ends.

FIG. 5 furthermore shows a simplified design of the arrangement depicted in FIG. 1, whereby both cam disc 14 and cam disc 22 operate the same contacts 26 and 27. The arrangement operates in the following manner: after a given period of time, shoulder 32 of cam disc 14 reaches contact 26 and bends it so as to connect with contact 27. In that way only contacts 26 and 27 serve to shunt resistor 17 so that the magnetization current of motor 4 is increased. Thereafter cam disc 22 commences to run thereby holding contacts 26 and 27 in a closed position for a complete revolution of disc 22.

During the revolution of cam disc 22, corresponding to a step of switching disc 15, the coupling, consisting of intermediate wheel and pinion 11 is disengaged and cam disc 14 is recoiled back into its starting or zero position as outlined above. Independent of that, cam disc 22 affixed to hollow shaft 24 completes its revolution until contacts 26 and 27 pass through recess 31 and open with the effect outlined above. One reservation must be made for this arrangement, namely that only one impulse time can be controlled.

In FIG. 6 one can see more clearly how pinion 7 is coupled to gear wheel 20 when the armature or rotor shifts; only coupling and decoupling with wheel 20 is shown herein. A change in the magnetization current shifts the armature, whereby, for instance, the winding of motor 4 is directly placed between potentials 34 and 35, and pre-resistor 17 is shifted into this circuit to decrease the magnetization current. Certainly, other arrangements for changing the magnetization current are conceivable, i.e., a number of windings or connections on a multiple winding.

FIG. 7 depicts another design of such a driving mechanism. In this design the armature is not shifted, but an armature 36, capable of axial movement, has a pinion 37 and engages gear wheel 38 therewith. Gear wheel 38 drives gear wheel 40 (corresponding to wheel 20 of FIG. 1) and other parts of the gear with its pinion 39. In this case the coupling is presented as a magnetic clutch. An electro-magnet 41 has an armature which operates a lever 42 and thereby shifts shaft 43 with gear wheel 38 and pinion 35. Magnet 41 is also connected to lines 34 and 35 via a control switch 44.

The advantage of this arrangement lies in the fact that only smaller masses have to be shifted, so that a rapid stop can be made, since no moments of inertia have to be retarded. When the voltage from potential 34 and 35 is taken away from magnet 41 by opening switch 44, shaft 43 and gear wheel 38 return to the engaged position, as illustrated, under the pressure of a spring 45. This arrangement works in such a way that gear wheel 38 and pinion 37 are engaged when the magnet is without current. Gear wheel 38 is disengaged from pinion 37 when current flows through magnet 41. The action of contact 44 indicated, corresponds to the action of the contacts 26 and 27 in FIG. 1 which increase or decrease the magnetization current. Pinion 37, of course, retains engagement with wheel 8 (FIG. 11), not shown here.

FIG. 8 depicts another design of a sliding rotor. This arrangement operates with a magnetic yoke divided into two parts, consisting of yoke 46, and yoke 47. Rotor 48 is drawn into engagement with gear wheel 49 or 50 depending upon which yoke, 46 or 47 is activated. Alternative activation of yokes or stator 46 and 47 is, of course, controlled by contacts such as 26, 27, 1, 2, 3 (FIG. 1). Pinion 51, drives accordingly, the timed pulse device or the stepping device for the program contacts. The advantage of this arrangement is not only that full magnetization power is exploited in both positions, but also that a greater independence from shock persists, since the action does not take place counter to any spring force. The strong magnetic catch makes the mechanism shock proof in both positions.

FIG. 9 shows a particularly reliable construction of the coupling between rotor 5, the gearing for the pulse device and the stepping device. Parts having the same function are designated alike. The advantage of this arrangement lies in the fact that pinion 7 always remains engaged with gear wheel 8, even when rotor 5 is shifted. Power transmission for the stepping device is effected over a clutch 52 co-operating with mating claws 53. Pinion 7 continuously drives the pulse device via gear wheel 8 and pinion 9 and the elements shown in FIG. 1 for drivingly connecting pinion 9 to disc 14.

Upon increase of its magnetization current rotor 5 is shifted in the direction of arrow 54 and engages clutch 52 with mating claws 53 over a double-armed lever 55 and a transmission member 56. Now power is transmitted from pinion 7 over gear wheel 8, clutch 52 and a pinion 57 to a gear wheel 58 and thereby over intermediate elements to switching disc 15. This drive also operates cam disc 22 for the automatic cut-out.

Upon decrease of the magnetization current after a completed step, a spring 59 resiliently connecting clutch 52 and claws 53 brings all the parts of the coupling into their initial, i.e., disengaged position. Also spring 59 forces rotor 5 back into the position where it runs as synchronous motor. This is also effected by lever 55. The particular advantage of this arrangement not only lies in the fact that pinion 7 always remains engaged with gear wheel 8, but also a certain shock-protection is gained because transmission member 56 has a predetermined mass relationship to the rotor. This arrangement is particularly advantageous when rotor 5 has twice the mass of member 56. In this case, symmetric acceleration relations result, because the acceleration forces of rotor 5 and of transmission part 56 can be balanced in their direction by means of the double-armed lever 55, in suitably selecting the distances of the action points of lever 56 from pivot 60. Here, the static effect of counterspring 59 is taken into consideration.

FIG. 10 shows another design of the coupling between rotor 5 and the step switching device. In this case, there is provided a leaf spring 61 which grips both rotor shaft 6 and transmission member 56. In this arrangement also, there is a great independence of acceleration forces.

Turning now to FIG. 11, there is illustrated a circuit network useable as a specific program contact system. For reasons of simplicity the coupling and gearing systems explained in connection with the previously described figures has been omitted here, and the driving connection of motor 4 is made as if coupled to the step switching device.

Now a slider 62 is geared to the motor and is seated, for example, on the shaft of the disc 15 of FIG. 1. Slider 62 is permanently electrically connected to terminal 35 via an inner contact ring, slider 62 successively engages for contact making contact segments 68, 69, 70 and 71 (counter-clockwise rotation). FIG. 11 now shows how one can by-pass the contacts 26 and 27 by means of these contact segments, so that the current to motor 4 is not interrupted after one step and the motor and slider continues to run as step switching device rather than again as pulse device as was explained in connection with FIG. 1.

As can be seen from FIG. 11, the segments 68 to 71 are respectively governed by switches 63 to 66. This means, that as long as for example switch 65 is closed the positive voltage terminal 35 is connected to relay 79 now closing contact 80 and thus connecting motor terminal 18 directly to ground terminal 34. Thus motor 4 will continue to run until slider 62 has reached the end of segment 70 and contact 80 is opened again. Thereafter interrupted disc 22 with contacts 26 and 27 govern the connection of motor terminal 18 to ground 34.

The invention can be used in all cases where one desires to construct a motor and its coupling in such a way that in one position of the coupling, with a very small load, transmission takes place, suitable for a time switch, and in the other position, with huge loads, transmission suitable for the stepping of the contacts.

The invention can also be used in all cases where two driving means are available for a control, where greatest degree of precision is demanded from one driving mechanism, and a high mount of torque required of the other.

I claim:

1. Driving apparatus for a program and timed pulse control device in a washing machine, comprising: an electric motor having an axially displaceable armature capable of assuming a first and a second axial position; a rotatable pulse device for operating upon stationary contacts; a rotating step switching device; a first gearing means coupling said armature to said pulse device for rotation thereof; a second gearing means coupling said armature to said step switching device only when said armature is in said first position; means actuated by said step switching device for recoiling said pulse device to its starting position when said second gearing means is drivingly coupled to said step switching device; mechanical control means for shifting said rotor from said first to said second position; and electric control means actuated upon by said pulse device and connected to said electric motor to increase magnetization of said armature and shifting it axially from said second to said first position for starting said step switching device.

2. Driving apparatus for a program and timed pulse control device in a washing machine, comprising: an electric motor having an axially displaceable armature, capable of assuming a first and a second axial position; a control circuit for said motor governing the energization of said armature; a rotatable pulse device for operating upon stationary contacts; further stationary contact means actuated by said pulse device including contacts inserted in said control circuit and effective for increasing the magnetization and shifting said rotor into said first position; a first gearing means coupling said armature to said pulse device for rotation thereof; a rotating step switching device including mechanical control means effective in said control circuit for effecting return of said rotor to said second position after one step; and a second gearing means coupling said rotor to said step switching device only when said rotor is in said first position.

3. Driving apparatus for a program and timed pulse control device in a washing machine, comprising: an electric motor having an axially displaceable armature capable of assuming a first and a second axial position; a rotatable pulse device for operating upon stationary contacts; a first gearing means drivingly coupling said armature to said pulse device for rotation thereof; electric control means connected to said motor and governing the magnetization of said armature and being actuated by said pulse device for shifting said armature from said second to said first position in increasing the magnetization thereof; a rotating step switching device including means for disabling said control means so as to decrease the said magnetization; mechanical control means including a spring for returning said rotor to said second position when said control means are disabled; and a second gearing means coupling said rotor to said step switching device only when said rotor is in said first position.

4. Device as set forth in claim 3 said mechanical control means further including a lever biased by said spring for effecting the coupling of said second gearing means.

5. Driving apparatus for a program control contact device and timed pulse control device in a washing machine, comprising: an electric motor having an axially displaceable armature capable of assuming a first and a second axial position; a rotatable pulse device for operating upon stationary contacts; a first gearing means coupling said armature to said pulse device for rotation thereof; electric control means connected to said motor for governing magnetization of said armature and being actuated by said pulse device for shifting said rotor from said second to said first position in increasing the said magnetization; a rotating step switching device including means for disabling said control means and decreasing the said magnetization; mechanical control means including a spring for returning said armature to said second position when said control means are disabled; a lever engaged by said armature and biased by said spring; a clutch and claw arrangement geared to said step switching device and said armature; and means for linking said lever to any of said clutch and claw for causing engagement thereof when said armature is in said first position, manually actuated contacts cooperating with the program control contacts for bridging over said pulse operated contacts, whereby when an reselected setting is reached in said program control, the latter is passed over because of the bridging over of said contacts.

6. Device as set forth in claim 5, said lever being a pivoted double arm lever, one arm engaging said armature the other arm said clutch and claw arrangement, the distribution of mass moved by and in conjunction with any pivot motion of said lever being selected that the mass at the armature-side is about twice the mass at the other side.

7. Device as set forth in claim 5, said lever being a double-arm-leaf-spring with one side thereof engaging said armature the other side thereof engaging said clutch.

8. Driving apparatus for a program and timed pulse control device in a washing machine, comprising: an electric motor having an axially displaceable armature capable of assuming a first and a second axial position; a rotatable pulse device for operating upon stationary contacts; a rotating step switching device; a first gearing means coupling said armature to said pulse device for rotation thereof; a second gearing means coupling said rotor to said step switching device only when said rotor is in said first position, mechanical control means for shifting said rotor from said first to said second position and electric control means actuated upon by said pulse device and connected to said electric motor to increase magnetization of said armature and shifting it axially from said second to said first position for starting said step switching device.

9. Device as set forth in claim 8 said electric control means including a contact-resistor arrangement governing the current supply to said motor.

10. Device as set forth in claim 8 said electric control means including a switching contact-resistor arrangement governing the magnitude of the current supply to said motor for moving said armature from said second to said first position, said mechanical control means comprising: a spring for axially returning said rotor to said second position.

11. Driving apparatus for a program and timed pulse control device in a washing machine, comprising: an electric motor having an axially displaceable armature capable of assuming a first and a second axial position; a rotatable pulse device for operating upon stationary contacts; a first gearing means for making a driving connection between said armature and said pulse device for rotation thereof and including coupling means for disengaging the connection between armature and pulse device; means for recoiling said pulse device to its starting position when said connection is disengaged; a rotating step switching device including means for acting upon said coupling for disengaging said connection; a second gearing means coupling said armature to said step switching device only when said armature is in said first position; mechanical control means for shifting said rotor from said first to said second position and electric control means actuated upon by said pulse device and connected to said electric motor to increase magnetization of said armature and shifting it axially from said second to said first position for starting said step switching device.

12. Driving apparatus for a program and timed pulse control device in a washing machine, comprising: an electric motor having an axially displaceable armature capable of assuming a first and a second axial position; a rotatable pulse device for operating upon stationary contacts; a rotating step switching device; a first gearing means coupling said armature to said pulse device for rotation thereof; a second gearing means coupling said armature to said step switching device only when said armature is in said first position; a control circuit including a resistor and contact means for overbridging said resistor, said resistor being in circuit with said motor and governing its current supply and the magnetization of said armature, said contact means being open to keep said armature in said second position and closed to keep said armature in said first position; first cam means rotating with said pulse device for closing said contact means; and second cam means connected to and rotating with said step switching device for opening said contact means thus interrupting any overbridging of said resistor when said step switching device has completed a step.

13. Driving apparatus for a program and timed pulse control device comprising: an electric motor having an armature and a shaft supporting said armature; a pinion on said shaft; a rotatable pulse device for operating upon stationary contacts; a rotating step switching device; a first gearing means coupling said pinion to said pulse device for rotation therewith; a second gearing means coupling said pinion to said step switching device; and electromagnetic means shifting said armature and said shaft in axial direction for causing disengagement of said second gearing means from said pinion after completion of a step, and mechanical means producing re-engagement of said pinion therewith in dependence upon the pulse device.

14. Driving apparatus for a program and timed pulse control device comprising: an electric motor having an armature and a shaft supporting the armature; a pinion on said shaft; a second shaft; a rotatable cam disc on said second shaft, co-operating with stationary contacts and constituting a pulse device; a first gear drivingly connecting said pinion and said cam disc for common rotation and including two disengageable meshing gear wheels which when disengaged interrupt the connection between cam disc and pinion; a rotating step switching device including a hollow shaft receiving said second shaft; an excenter disc on said hollow shaft for temporarily disengaging said gear wheels, spring means recoiling said cam disc when said gear wheels are disengaged; a second gearing means coupling said pinion to said step switching device; control means for said motor governing the magnetization of said armature and causing disengagement of said second gearing means from said pinion after completion of a step; and mechanical control means engaging said shaft for re-engagement of said pinion and said second gearing means in dependence upon the pulse device.

15. Driving apparatus for a program and timed pulse control device comprising: an axially displaceable shaft; an armature on said shaft moving therewith; a pinion on said shaft; a rotatable pulse device including a cam disc; stationary contacts actuated by said cam disc; a rotating step switching device; a first gearing means coupling said pinion to said pulse device for rotation therewith; a second gearing means coupling said pinion to said step switching device; and electromagnetic means governed by said stationary contacts for controlling energization and axial shifting of said armature and disengaging said second gearing means from said pinion after completion of a step.

16. Driving apparatus for a program and a timed pulse device comprising: an electric motor having two separately energizable and coaxially aligned stator yokes, and an axially displaceable armature selectively co-operating with said stators; a shaft for said armature having a pinion axially displaceable in conjunction with said armature; a rotatable pulse device for operating upon stationary contacts; a rotating step switching device; a first gearing means coupling said pinion to said pulse device for rotation therewith; a second gearing means coupling said pinion to said step switching device; and means for axially shifting said armature so that said pinion selectively engages said first and said second gearing means.

References Cited in the file of this patent
UNITED STATES PATENTS 2,599,234   Clark _____ June 3, 1952
3,041,480   Holzer _____ June 26, 1962